United States Patent
Danz et al.

(10) Patent No.: US 11,947,568 B1
(45) Date of Patent: Apr. 2, 2024

(54) WORKING SET RATIO ESTIMATIONS OF DATA ITEMS IN A SLIDING TIME WINDOW FOR DYNAMICALLY ALLOCATING COMPUTING RESOURCES FOR THE DATA ITEMS

(71) Applicant: Amazon Technologies, Inc., Seattle, WA (US)

(72) Inventors: Bryce Jonathan Danz, Kirkland, WA (US); Sankhyayan Debnath, Seattle, WA (US); Stefano Stefani, Issaquah, WA (US); Anton Shyrabokau, Seattle, WA (US); Mohammad Abu Obaida, Seattle, WA (US); Marc Brooker, Seattle, WA (US); David Charles Wein, Shoreline, WA (US); Zhonghua Feng, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/491,314

(22) Filed: Sep. 30, 2021

(51) Int. Cl.
*G06F 16/00* (2019.01)
*G06F 9/50* (2006.01)
(Continued)

(52) U.S. Cl.
CPC .......... *G06F 16/284* (2019.01); *G06F 9/5027* (2013.01); *G06F 12/0802* (2013.01);
(Continued)

(58) Field of Classification Search
CPC .. G06F 16/284; G06F 16/137; G06F 16/2255; G06F 16/2264; G06F 16/211;
(Continued)

(56) References Cited

U.S. PATENT DOCUMENTS 6,029,163 A * 2/2000 Ziauddin ............... G06F 16/284
6,353,833 B1 * 3/2002 Bird .................. G06F 16/24524
(Continued)

FOREIGN PATENT DOCUMENTS

EP 3279813 B1 * 9/2020
WO WO2008094455 A2 * 8/2008
(Continued)

OTHER PUBLICATIONS

Yantao Li et al., "Chaotic hash function based on the dynamic SBox with variable parameters", Nonlinear Dyn 84, 2387-2402 (2016).*
(Continued)

*Primary Examiner* — Srirama Channavajjala
(74) *Attorney, Agent, or Firm* — S. Scott Foster; Kowert, Hood, Munyon, Rankin & Goetzel, P.C.

(57) ABSTRACT

Working set ratio estimations of data items in a sliding time window are determined to dynamically allocate storage for the data items. A working set ratio may be determined by accessing a fixed-size array that stores respective timestamps of last accesses of data items to determine which data items are useful to determine an estimate of a working set for the application within a range of time. The working set ratio is then determined from an estimated working set and an amount of computing resources allocated to the application by the estimated working set. The amount of the computing resources allocated to the application may then be automatically scaled according to the determine working set ratio.

20 Claims, 10 Drawing Sheets

(51) Int. Cl.
*G06F 12/0802* (2016.01)
*G06F 16/22* (2019.01)
*G06F 16/23* (2019.01)
*G06F 16/2455* (2019.01)
*G06F 16/27* (2019.01)
*G06F 16/28* (2019.01)

(52) U.S. Cl.
CPC ...... *G06F 16/2255* (2019.01); *G06F 16/2264* (2019.01); *G06F 16/2282* (2019.01); *G06F 16/2379* (2019.01); *G06F 16/2456* (2019.01); *G06F 16/275* (2019.01)

(58) Field of Classification Search
CPC ............... G06F 16/2379; G06F 7/5324; G06F 12/0895; G06F 12/0893; G06F 12/0877; G06F 12/125; G06F 12/0871; G06F 12/0897; G06F 12/0253; G06F 15/17375; G06F 15/17381; G06F 15/80; G06F 15/8092; G06F 9/30138; G06F 9/3803; G06F 16/2456; G06F 16/275; G06F 16/901; G06F 16/24554; G06F 16/2282
See application file for complete search history.

(56) References Cited

U.S. PATENT DOCUMENTS

| | | | | |
|---|---|---|---|---|
| 9,218,382 B1 * | 12/2015 | Muntes | ............... | G06F 11/3476 |
| 9,507,843 B1 * | 11/2016 | Madhavarapu | ..... | G06F 16/2358 |
| 9,519,540 B2 * | 12/2016 | Atkisson | .............. | H05K 7/1444 |
| 9,519,664 B1 * | 12/2016 | Kharatishvili | .......... | G06F 16/27 |
| 9,542,442 B2 | 1/2017 | Meiyyappan et al. | | |
| 9,983,929 B2 * | 5/2018 | Shalvi | ................... | G06F 11/108 |
| 10,182,022 B2 * | 1/2019 | Krinsky | .............. | H04L 49/9005 |
| 10,241,680 B2 * | 3/2019 | Datar | ..................... | G06F 3/0641 |
| 10,346,475 B2 * | 7/2019 | Ueda | ..................... | G06F 16/9014 |
| 10,642,831 B2 | 5/2020 | Ziauddin et al. | | |
| 11,048,599 B2 * | 6/2021 | Lee | ..................... | G06F 11/1458 |
| 11,120,176 B2 * | 9/2021 | Wang | ..................... | H04L 65/762 |
| 11,256,627 B2 | 2/2022 | Loaiza et al. | | |
| 2002/0026438 A1 * | 2/2002 | Rjaibi | ............... | G06F 16/24545 707/999.005 |
| 2003/0191924 A1 * | 10/2003 | Weaver | ............... | G06F 9/30127 712/217 |
| 2006/0074872 A1 * | 4/2006 | Gordon | ............ | G06F 16/24552 |
| 2008/0301256 A1 * | 12/2008 | McWilliams | ....... | G06F 12/0806 714/E11.178 |
| 2011/0072187 A1 * | 3/2011 | Forhan | .................... | G06F 13/24 711/216 |
| 2013/0139133 A1 * | 5/2013 | Odaira | ................ | G06F 12/0646 717/148 |
| 2015/0058356 A1 * | 2/2015 | Lyle | .................... | G06F 16/2255 707/747 |
| 2016/0042019 A1 * | 2/2016 | Oks | ........................ | G06F 16/00 707/602 |
| 2019/0384830 A1 * | 12/2019 | Nazi | ....................... | G06F 17/18 |
| 2021/0209027 A1 * | 7/2021 | Daga | ................... | G06F 12/0238 |
| 2021/0240616 A1 * | 8/2021 | Stabrawa | .............. | G06F 9/5016 |
| 2022/0229777 A1 * | 7/2022 | Shveidel | ................. | G06F 3/067 |

FOREIGN PATENT DOCUMENTS

| | | | |
|---|---|---|---|
| WO | WO 2008150927 A2 * | 12/2008 | |
| WO | WO2015051059 A1 * | 4/2015 | |
| WO | WO2016064575 A1 * | 4/2016 | |

OTHER PUBLICATIONS

Tim Gubner et al., "Efficient Query Processing with Optimistically Compressed Hash Tables & Strings in the USSR", 2020 IEEE 36th International Conference on Data Engineering (ICDE), May 2020, pp. 301-312.*

Midorikawa, H et al., "Automatic Adaptive Page-Size Control for Remote Memory Paging", 12th IEEE/ACM International Symposium on Cluster, Cloud and Grid Computing (ccgrid 2012) (pp. 694-696), May 2012.*

* cited by examiner

WORKING SET RATIO ESTIMATIONS OF DATA ITEMS IN A SLIDING TIME WINDOW FOR DYNAMICALLY ALLOCATING COMPUTING RESOURCES FOR THE DATA ITEMS

BACKGROUND

Commoditization of computer hardware and software components has led to the rise of service providers that provide computational and storage capacity as a service. At least some of these services (e.g., managed services such as managed relational database services) can be difficult to scale, including scaling the processing capacity. Disruption of an application or other process can be a high cost associated with changing capacity to better match workloads, as client applications may be interrupted due to dropped connections (and may not even retry to connect, in some instances). Techniques that can support scaling resources to match workloads therefore are highly desirable.

Figure 1A:
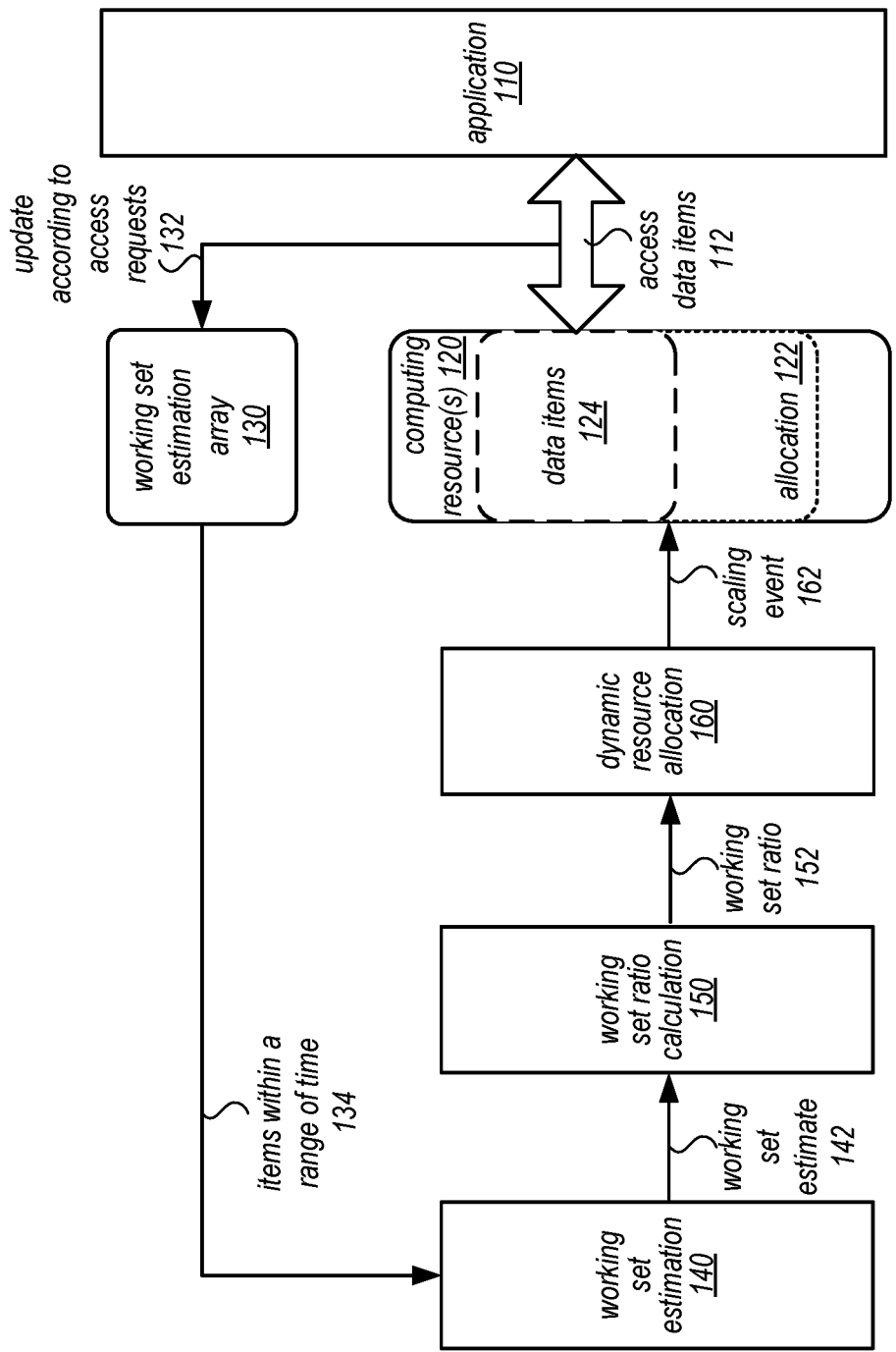
FIG. 1A is a logical block diagram illustrating working set ratio estimations of data items in a sliding time window for dynamically allocating computing resources for the data items, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for working set ratio estimations of data items in a sliding time window for dynamically allocating computing resources for the data items are described herein. Different applications may operate on unique items in order to perform various functions. The computing resource allocation, such as an allocation for storage, processor capacity, network bandwidth, and/or other computing resources, for these unique items may impact the performance of the application overall. For example, a "buffer cache" in a memory or other type of storage device which stores unique items, data pages that include database data, in a relational database may greatly affect the performance of the database system and may also a substantial driver of operating costs as the presence (or absence) of a data page in the buffer cache may affect how quickly a database query can be performed (e.g., queries that do not have to fetch data from other storage devices, such as a disk storage device, may perform substantially faster than queries that do have to fetch data). Therefore, techniques that allow the allocation of storage for an application, such as a database system, to react to changes in workload in real time to predict the correct allocation of storage for items (e.g., the correct buffer pool size) will balance good application performance while also avoiding costly over-provisioning.

To understand how to allocate computing resources dynamically, working set ratio estimations of data items in a sliding time window may be performed. A working set ratio may be determined from the amount of allocated computing resources for items and the number of unique items (e.g., the number of data pages that can be stored in the buffer cache divided by the number of unique data pages likely to be stored in the buffer cache), such as by dividing the amount allocated computing resources for items by the number of unique items (or vice versa). In order to estimate working set ratio, a working set (e.g., a distinct count of unique data items, which may also be referred to as the cardinality of data items), may be used to estimate the optimal amount of computing resources to allocate to serve an expected workload. As discussed in detail with regard to FIG. 1B, a fixed-size array may be used to collect information and provide information to determine working set estimates in a way which is immune to race conditions and uses a constant amount of additional memory, minimizing the impact of such techniques on application performance.

FIG. 1A is a logical block diagram illustrating working set ratio estimations of data items in a sliding time window for dynamically allocating storage for the data items, according to some embodiments. Application 110 (e.g., a database system, like database engine head nodes hosted in database service 310 in FIG. 3) or other application that utilizes data items 124 through computing resources 120, such as storage for items (e.g., memory, disk or other storage devices), processing capacity for items (e.g., processor capacity for performing various operations on data items, network or storage I/O bandwidth (e.g., for moving data items) allocated 122 to application 110 to perform various operations by accessing the data items, as indicated at 112. Techniques to optimally scale the allocation 122 may be implemented in order to improve application 110 performance without over allocating and creating computing resource 120 waste.

For example, a working set estimation array 130 (e.g., discussed in more detail with regard to FIG. 1B) may be updated to reflect the frequency of data item access, as indicated at 132 (e.g., according to techniques discussed below with regard to FIG. 8). Items within a range of time 134 may be pulled (e.g., according to techniques discussed below with regard to FIG. 7), and used to determine a working set estimation value, as indicated at 140. For example, a HyperLogLog technique which utilizes the counts of leading zeroes of hash values used to index data items from a stochastic range may be used within the range of time may be performed to produce a working set estimate, as discussed in detail below with regard to FIG. 7. Working set ratio calculation 150 may then take a current allocation 122 divide it by the working set estimate 142 and produce the working set ratio 152. Dynamic storage scaling 160 may then apply various criteria for different scaling events (e.g., scale up or scale down events) to detect and perform scaling events 162 to change the allocation 122 for application 110.

Figure 1B:
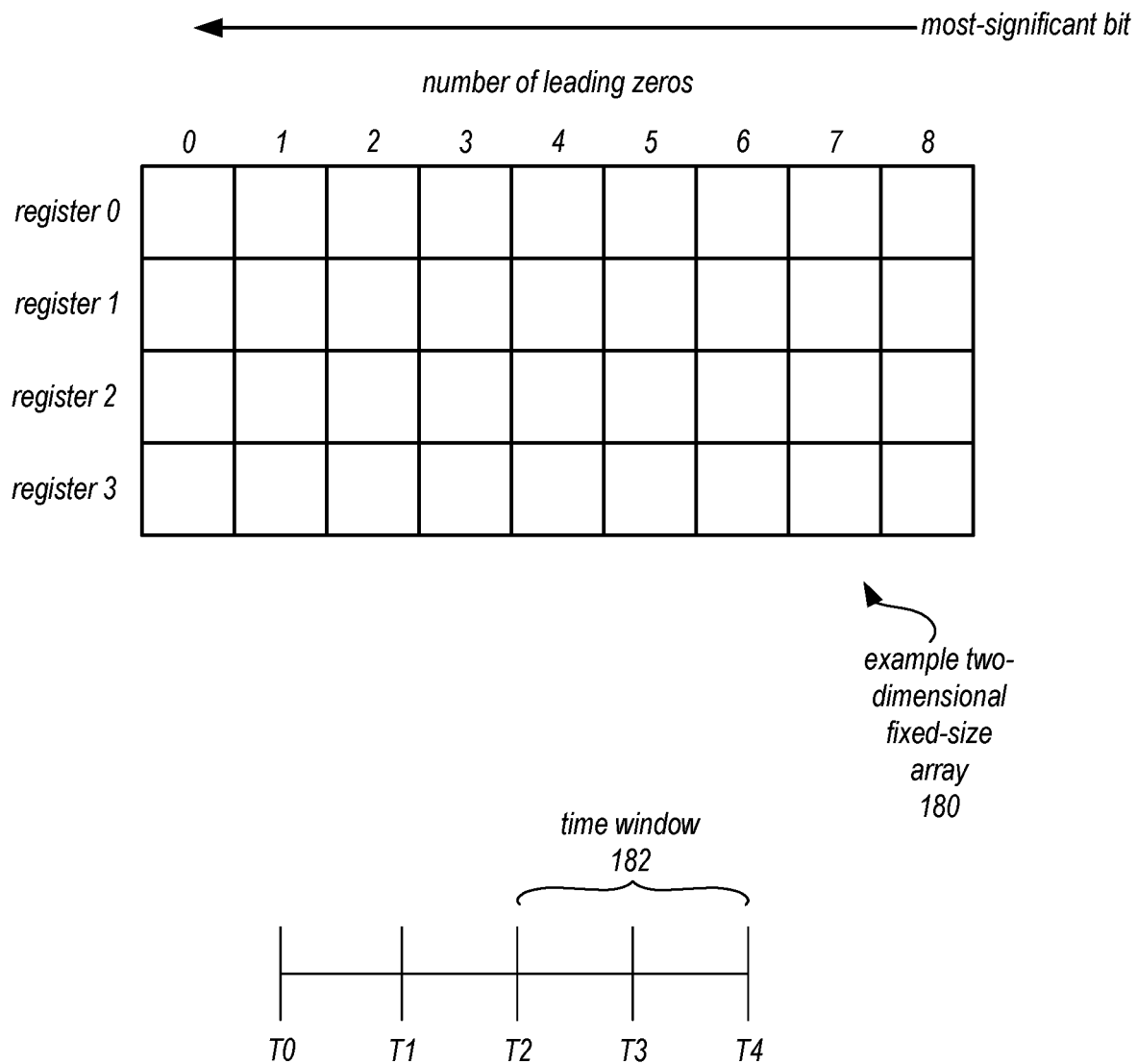
FIG. 1B is a logical block diagram illustrating an example of a fixed size array used to determine a working set ratio, according to some embodiments.

FIG. 1B is a logical block diagram illustrating an example of a fixed-size array (used to determine a working set ratio, according to some embodiments. Each row in two-dimensional fixed-size array 180 may correspond to a register value taken from a hash value for an item. For example, a first number of bits (e.g., 9 bits) may be taken from the hash value. The remaining bits may be the stochastic range. The stochastic range and registers may be used to identify which entries in array 180 to update. For example, a hash code "110000110100011101111111001" may be split into a register using the first 2 bits, "11" and the remaining values "0000110100011101111111001" may be the stochastic range.

Register "3" may then be identified and column "4" identified as the stochastic range has 4 leading zeros. A timestamp may then be written into register 3 column for application operation that accessed that data item corresponding to that hash value.

Because timestamps are stored, techniques to retrieve a range of time corresponding to a time window may be supported. For example, time window 182 that includes a current time T4 back to time T2, may be used to filter out those entries that are for items accessed outside of the time range desired for a working set estimate.

Please note, FIGS. 1A-1B are provided as logical illustrations of working set ratio estimations of data items in a sliding time window for dynamically allocating storage for the data items, and are not intended to be limiting as to the physical arrangement, size, or number of components, modules, or devices to implement such features.

The specification first describes an example network-based database service that performs working set ratio estimations of data items in a sliding time window for dynamically allocating computing resources for the data items. Included in the description of the example network-based database service are various aspects of the example network-based database service, such as a database instance, and a separate storage service. The specification then describes flowcharts of various embodiments of methods for working set ratio estimations of data items in a sliding time window for dynamically allocating computing resources for the data items. Next, the specification describes an example system that may implement the disclosed techniques. Various examples are provided throughout the specification.

Figure 2:
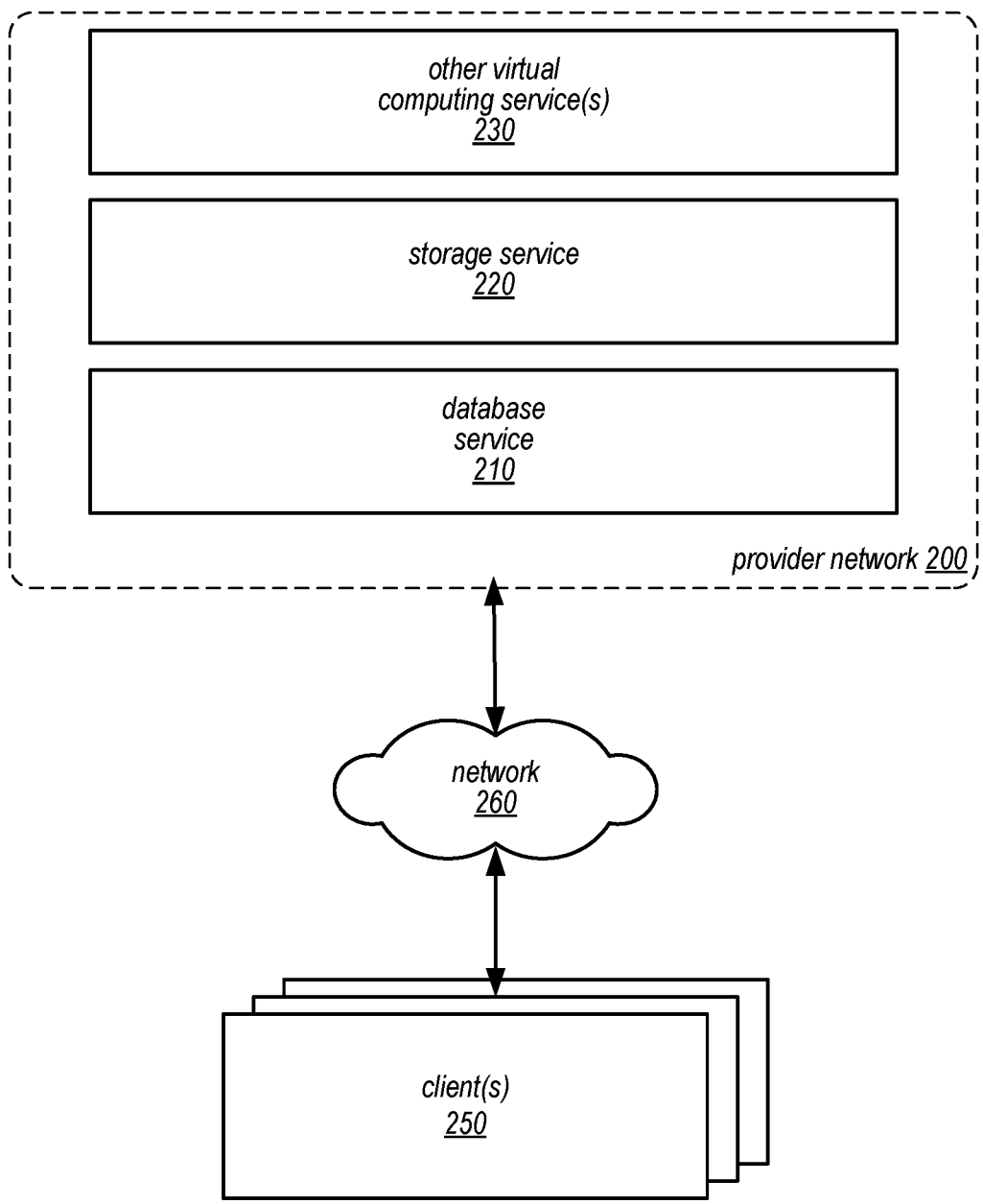
FIG. 2 is a block diagram illustrating a provider network that may implement a database service that implements working set ratio estimations of data items in a sliding time window for dynamically scaling buffer cache storage, according to some embodiments.

FIG. 2 is a block diagram illustrating a provider network that may implement a database service that implements working set ratio estimations of data items in a sliding time window for dynamically scaling buffer cache storage, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions 200.

In the illustrated embodiment, a number of clients (shown as clients 250 may interact with a provider network 200 via a network 260. Provider network 200 may implement respective instantiations of the same (or different) services, a database services 210, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, storage service 220 and/or another virtual computing service 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
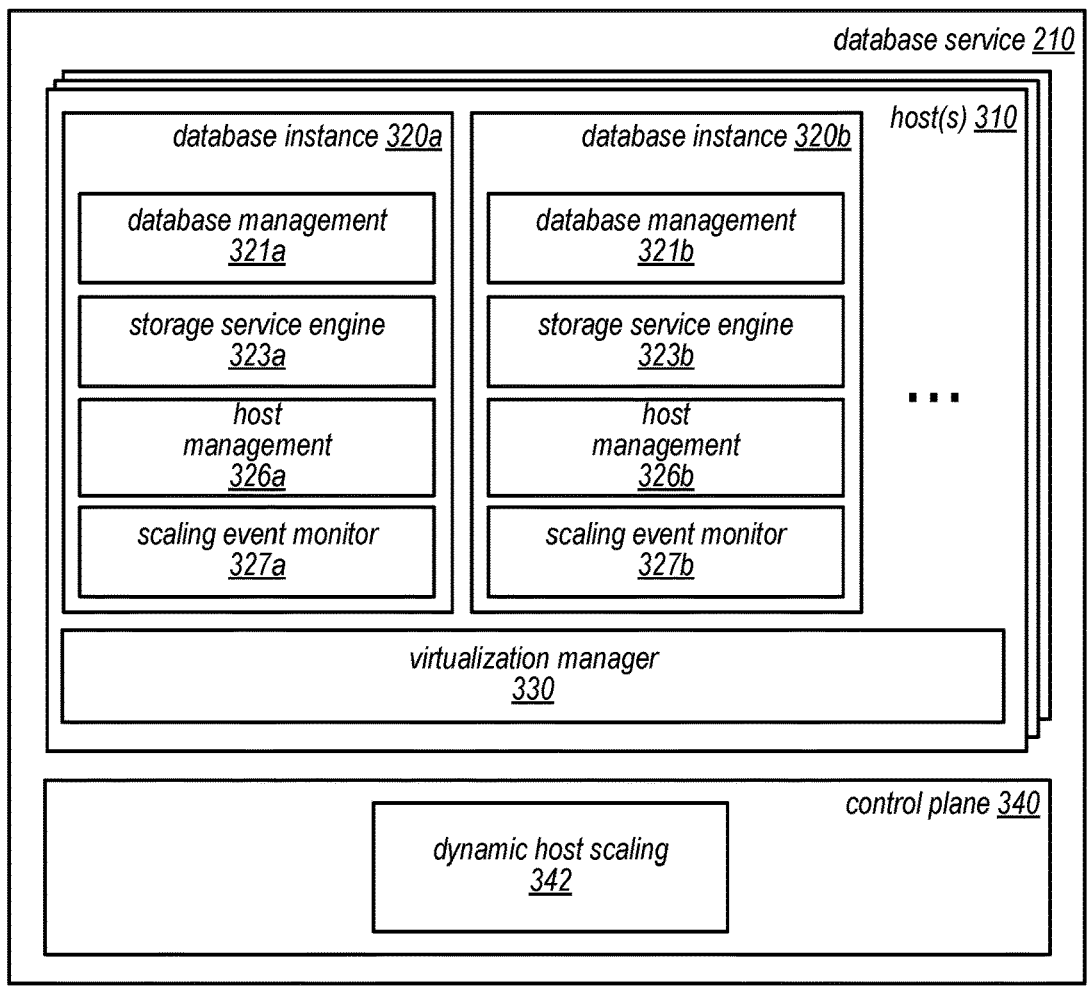
FIG. 3 is a block diagram illustrating various components of a database service and storage service that provides access to a database, according to some embodiments.
Figure 3:
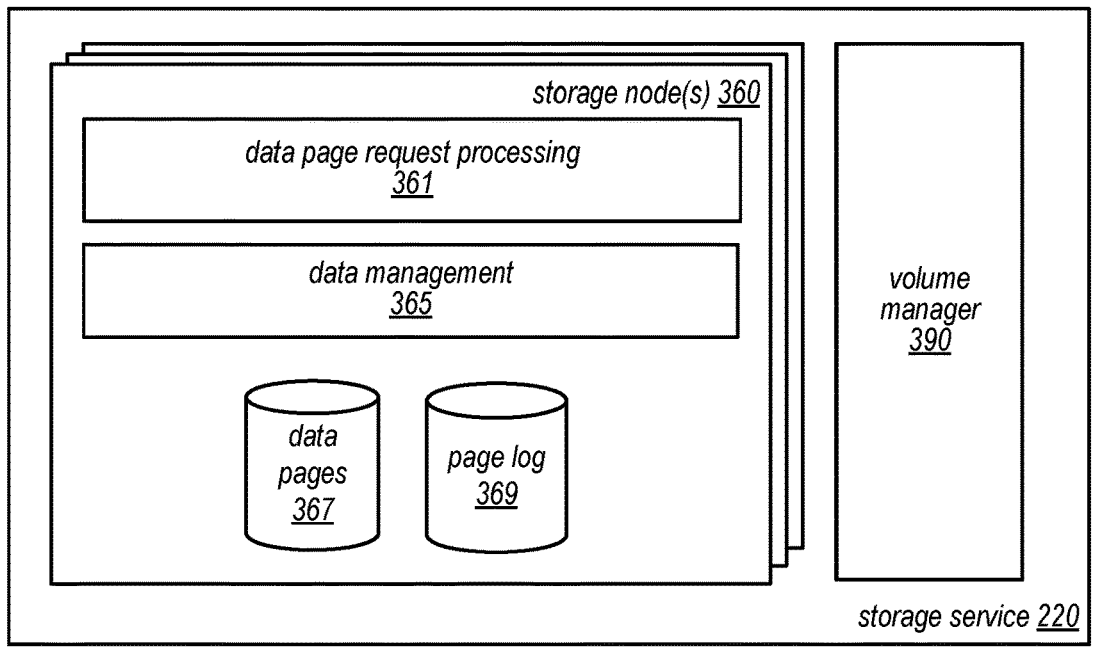

FIG. 3 is a block diagram illustrating various components of a database service and storage service that provides access to a database, according to some embodiments. Database service 210 may implement control plane 340 which may manage the creation, provisioning, deletion, or other features of managing a database hosted in database service 210. For example, control plane 340 may monitor the performance of host(s) 310 (e.g., a computing system or device like computing system 1000 discussed below with regard to FIG. 9) for high workloads (e.g., heat) and move or redirect placement of database engine head node instances away from some hosts to avoid overburdening host(s) 310. Control plane 340 may handle various management requests, such as request to create databases, manage databases (e.g., by configuring or modifying performance, such as by enabling a "serverless" or other automated management feature in response to a request which may cause resource scaling to be enabled for that database. For example, control plane 340 may implement dynamic host scaling 342 as discussed above with regard to FIG. 1 and below with regard to FIGS. 5-8 in order to utilize working set ratios for a database engine head node to automatically scale buffer cache sizes for a database system or other computing resource allocations for a database system. Control plane 340 may direct placement of database instances 320 on host(s) 310 so as to distribute workload across host(s) 310 to avoid failure scenarios, like out-of-memory.

Database service 210 may implement one or more different types of database systems with respective types of database management systems for accessing database data as part of the database. For example, database service 210 may implement various types of connection-based (e.g., having established a network connection between a database client and database engine head node 320) database systems which may, for instance, facilitate the performance of various operations that continue over multiple communications between the database client and the connected database instances 320. In at least some embodiments, database service 210 may be a relational database service that hosts relational databases on behalf of clients.

Database service 210 may implement a fleet of host(s) 310 which may provide, in various embodiments, a multi-tenant configuration so that different database instances, such as database instances 320a and 320b, can be hosted on the same host 310, but provide access to different databases on behalf of different clients over different connections. While hosts(s) 310 may be multi-tenant, each database instance 320 may be provisioned on host(s) 310 in order to implement scaling (e.g., by overprovisioning resources initially and then scaling-based on workload to right-size the capacity that it is recorded as utilized for an account that owns or is associated with the database that is accessed by the database instance node 320).

In various embodiments, host(s) 310 may implement a virtualization technology, such as virtual machine based virtualization, wherein database engine head node instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database instance (s) 320) that were allocated to a database instance 320 upon creation at host(s) 310.

Database instance(s) 320 may support various features for accessing a database, such as database management 321a and 321b (e.g., which may be a database management system (DBMS)), and storage service engine(s) 323a and 323b discussed in detail below with regard to FIG. 4, as well as for performing in-place scaling, as discussed in detail below with regard to FIG. 5. Database engine instances 320 may implement agents, interfaces, or other controls according to the respective type of virtualization used to collect and facilitate communication of utilization metrics for scaling, among other supported aspects of virtualization, such as host management 326a and 326b. For example, as discussed in detail below with regard to FIG. 5, scaling event monitor, such as scaling event monitors 327a and 327b, can collect information to determine working set ratios to provide to host management 326.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage.

For example, data may be organized in various logical volumes, segments, and data pages for storage on one or more storage nodes 360 of storage service 220. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a data page may be a block of storage, generally of fixed size. In some embodiments, each data page may be a block of storage (e.g., of virtual memory, disk, or other physical memory) of a size defined by the operating system, and may also be referred to herein by the term "data block". A data page may be a set of contiguous sectors, in some embodiments. A data page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
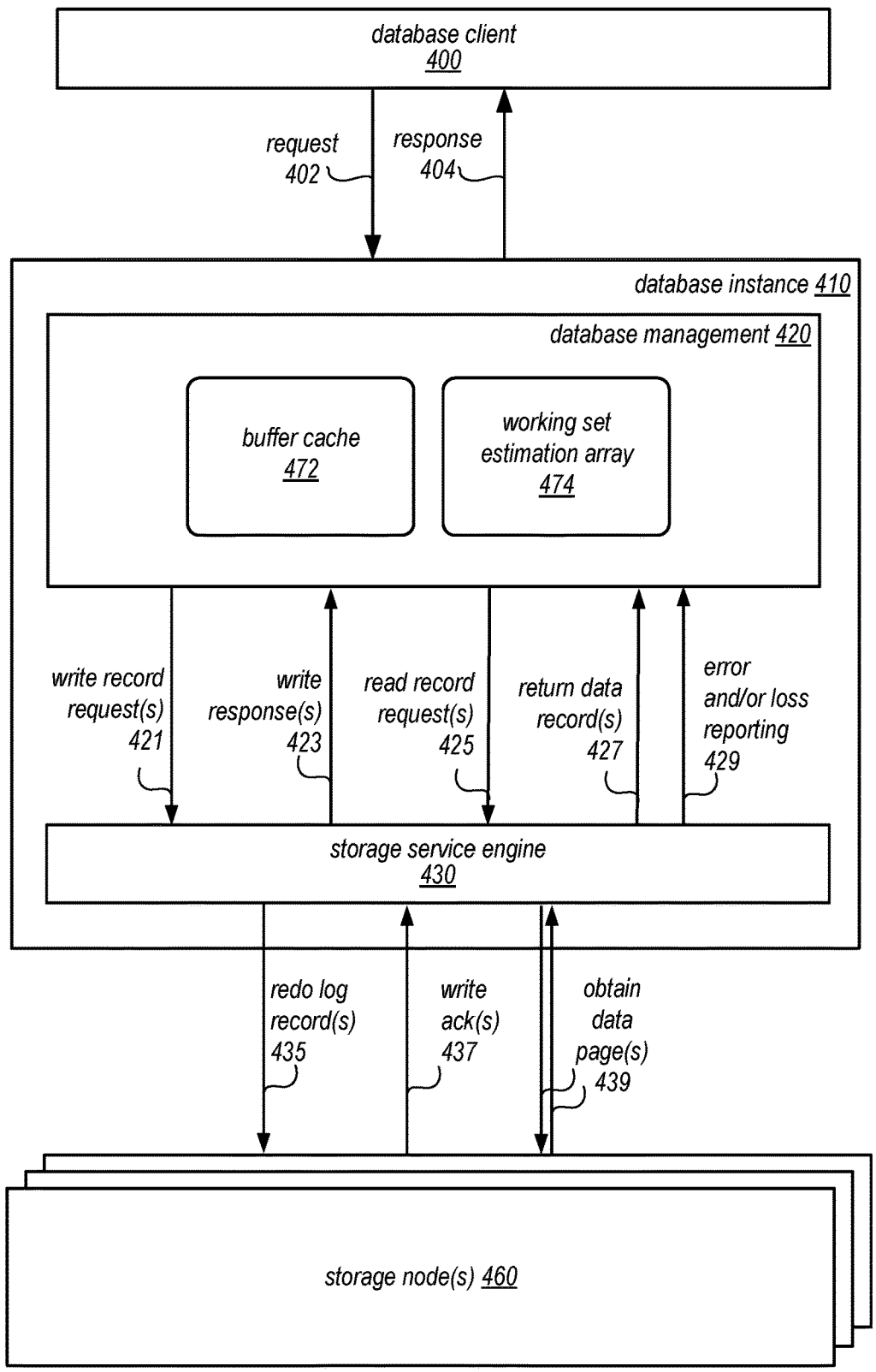
FIG. 4 is a block diagram illustrating various interactions to handle database client requests, according to some embodiments.

FIG. 4 is a block diagram illustrating various interactions to handle database client requests, according to some embodiments. In the example database system implemented as part of database service 210, a database instance 410 may be implemented for each database and storage nodes 460 (which may or may not be visible to the clients of the database system and may be similar to storage nodes 360 discussed above with regard to FIG. 3). Clients of a database may access a database instance 410 directly in some embodiments via network utilizing various database access protocols (e.g., Java Database Connectivity (JDBC) or Open Database Connectivity (ODBC)). However, storage nodes 460, which may be employed by the database service 210 to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 460 may perform various storage, access, change logging, recovery, log record manipulation, and/or space management operations in a manner that is invisible to clients of a database engine head node 410.

As previously noted, a database instance 410 may implements database engines (which may include database management 420 and storage service engine 430), in some embodiments. Database management 420 may receive requests, like request 412, which may include queries or other requests such as updates, deletions, etc., from resources a proxy connected to a database client 400 which first received the request 402 from the database client 400 (not illustrated) or directly from database client 400 (as illustrated). Implementing a proxy between database client 400 and database instance 410 may allow for database service 210 to change out database instances (e.g., to scale to larger or smaller database instances in order to increase or decrease hardware capacities for the database or to handle failure without causing an interrupt to database client) as part of various scaling events as discussed below. Database management 420 then parses them, optimizes them, and develops a plan to carry out the associated database operation(s).

Database management 420 may utilize buffer cache 472 to access previously retrieved data pages (e.g., as indicated at 439) in order to improve query performance. Database management 420 may also update working set estimation array 474 according to the techniques discussed below with regard to FIG. 8, in order to implement scaling techniques discussed below with regard to FIGS. 5-8.

Database management 420 may return a response 414 to the request (e.g., results to a query) which proxy 410 may provide as response 404 to database client 400, which may include write acknowledgements, requested data (e.g., records or other results of a query), error messages, and or other responses, as appropriate. As illustrated in this example, database instance 410 may also include a storage service engine 430 (or client-side driver), which may route read requests and/or redo log records to various storage nodes 460 within storage service 220, receive write acknowledgements from storage nodes 460, receive requested data pages from storage nodes 460, and/or return data pages, error messages, or other responses to query engine 420 (which may, in turn, return them to a database client).

Database management 420 may be responsible for providing transactionality and consistency in the database of which instance 410 is a component. For example, this component may be responsible for ensuring the Atomicity, Consistency, and Isolation properties of the database and the transactions that are directed that the database instance, such as determining a consistent view of the database applicable for a query, applying undo log records to generate prior versions of tuples of a database. Database management 420 may manage an undo log to track the status of various transactions and roll back any locally cached results of transactions that do not commit.

For example, a request 412 that includes a request to write to a page may be parsed and optimized to generate one or more write record requests 421, which may be sent to storage service engine 430 for subsequent routing to log-structured storage service 450. In this example, storage service engine 430 may generate one or more redo log records 435 corresponding to each write record request 421, and may send them to specific ones of the storage nodes 460 of storage service 220. Storage nodes 460 may return a corresponding write acknowledgement 437 for each redo log record 435 (or batch of redo log records) to database instance 410 (specifically to storage service engine 430). Storage service engine 430 may pass these write acknowledgements to database management 420 (as write responses 423), which may then send corresponding responses (e.g., write acknowledgements) to one or more clients as a response 414.

In another example, a request that is a query may cause data pages to be read and returned to database management 420 for evaluation. For example, a query could cause one or more read record requests 425, which may be sent to storage service engine 430 for subsequent routing to storage nodes 460. In this example, storage service engine 430 may send these requests to specific ones of the storage nodes 460, and storage nodes 460 may return the requested data pages 439 to database instance 410 (specifically to storage service engine 430). Storage service engine 430 may send the returned data pages to database management 420 as return data records 427, and database management 420 may then evaluate the content of the data pages in order to determine or generate a result of a query sent as a response 414.

In some embodiments, various error and/or data loss messages 441 may be sent from log-structured storage service 450 to database instance 410 (specifically to storage service engine 430). These messages may be passed from storage service engine 430 to database management 420 as error and/or loss reporting messages 429, and then to one or more clients as a response 414.

In some embodiments, the APIs 435-439 to access storage nodes 460 and the APIs 421-429 of storage service engine 430 may expose the functionality of storage service 220 to database instance 410 as if database instance 410 were a client of storage service 220. For example, database instance 410 (through storage service engine 430) may write redo log records or request data pages through these APIs to perform (or facilitate the performance of) various operations of the database system implemented by the combination of database instance 410 and storage nodes 460 (e.g., storage, access, change logging, recovery, and/or space management operations).

Note that in various embodiments, the API calls and responses between database instance 410 and storage nodes 460 (e.g., APIs 421-429) and/or the API calls and responses between storage service engine 430 and database management 420 (e.g., APIs 435-439) in FIG. 4 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 410 and/or storage nodes 460.

Figure 5:
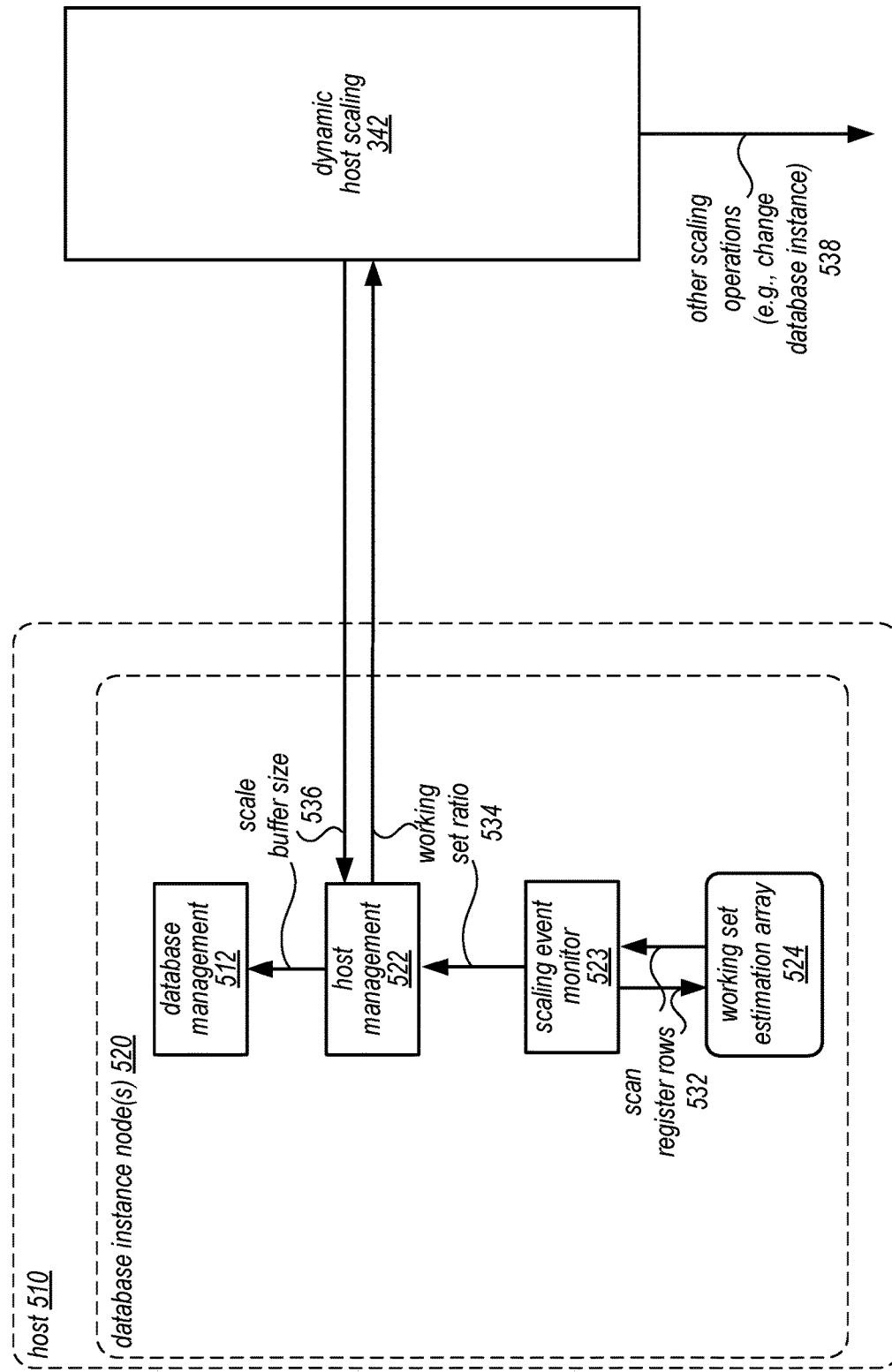
FIG. 5 is a block diagram illustrating interactions to detect scaling events and perform operations to scale computing resources, according to some embodiments.

FIG. 5 is a logical diagram illustrating interactions to detect scaling events and perform operations to scale computing resources, according to some embodiments. Host 510, which may be similar to hosts 310 in FIG. 3, may host database engine head node 520, which may perform various aspects of a database system, as discussed above with regard to FIGS. 3 and 4. As host 510 may implement multiple different database instances 520.

Database engine head node(s) 520 may implement various features, such as database management 526 (similar to database management discussed above with regard to FIGS. 3 and 4), and host management 522 (similar to host management 326 discussed above). To detect scaling events, scaling event monitor 523 may access the working set estimation array 524 updated by a database management 512 as discussed above with regard to FIG. 4. For example, local scaling management 523 may utilize a virtual function to perform techniques similar to those discussed below with regard to FIG. 7 to scan 532 register rows in array 524 in order to gather input data to apply HyperLogLog to produce an estimated working set for a range of time and then, for example, divide the amount of buffer cache by the estimated working set to determine the working set ratio (as discussed below with regard to FIG. 6).

Host management 522 may provide working set ratios, as indicated at 534, to dynamic host scaling 342, which may monitor and detect scaling events based on working set ratios, as well as other information such as data page utilization. Dynamic host scaling 342 may perform scaling by instructing various components in order to adjust a buffer cache size. For example, dynamic host scaling 342 may instruct 536 database management 512 (via host management 522) to scale the buffer cache size for database instance 520 by scaling up or down a determined amount. In some embodiments, dynamic host scaling 342 may implement various other scaling operations 538 (e.g., by moving a database to another type of instance or to move the database instance (or restart the database instance) at another host different from host 510 (e.g., in order to free up more capacity for a remaining host or to combine database instances with smaller buffer cache on a common host).

Figure 6:
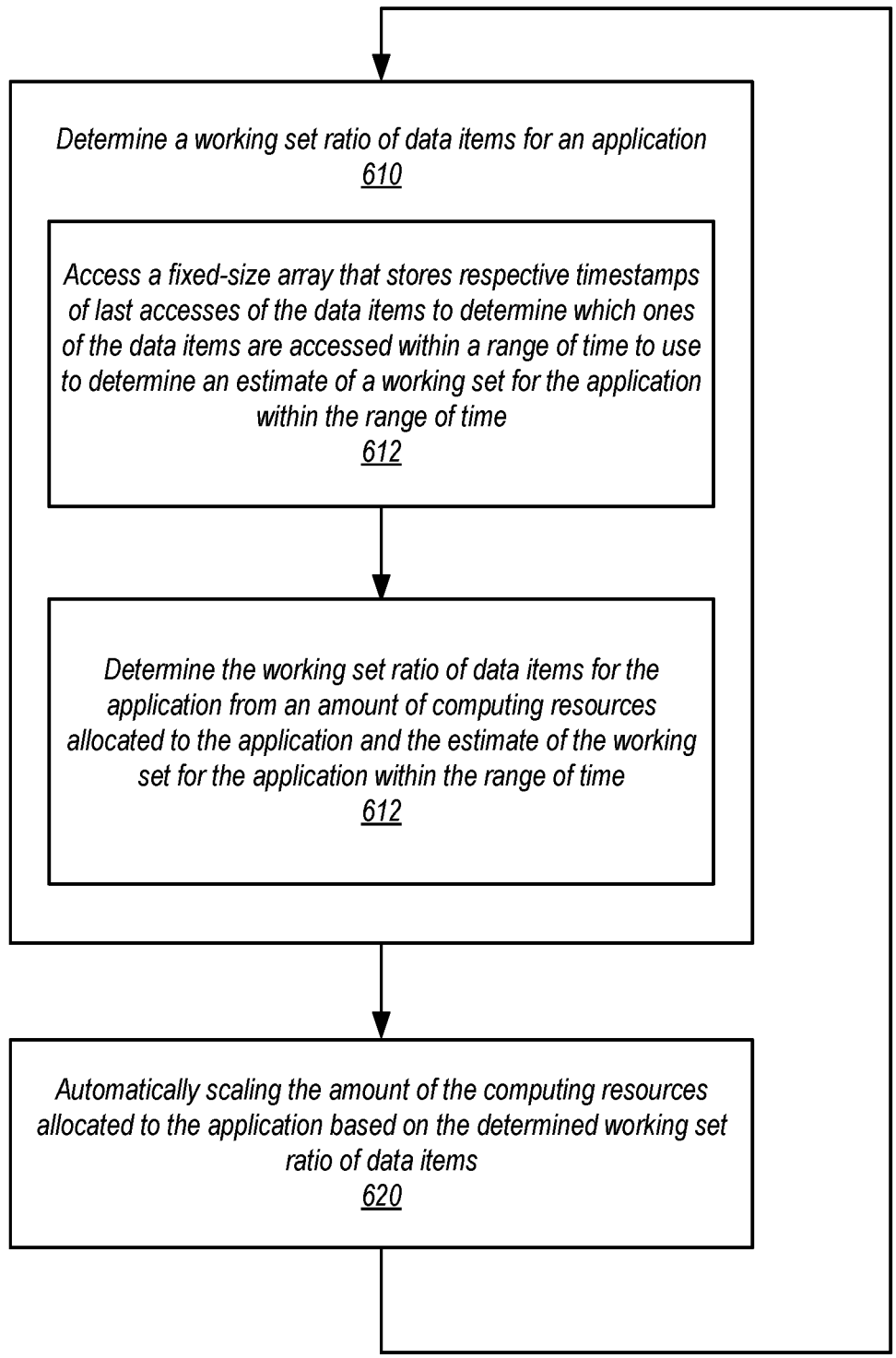
FIG. 6 is a high-level flowchart illustrating various methods and techniques to implement working set ratio estimations of data items in a sliding time window for dynamically allocating computing resources for the data items, according to some embodiments.

The database service and storage service discussed in FIGS. 2 through 5 provide examples of a database system that may implement working set ratio estimations of data items in a sliding time window for dynamically allocating computing resources for the data items, according to some embodiments. However, various other types of applications for which working sets may provide a workload indication in order to right size computing resource allocation for data items may implement working set ratio estimations of data items in a sliding time window for dynamically allocating computing resources for the data items. FIG. 6 is a high-level flowchart illustrating various methods and techniques to implement working set ratio estimations of data items in a sliding time window for dynamically allocating computing resources for the data items, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 610, a working set ratio of data items for an application may be determined, in some embodiments. For example, as indicated at 612, a fixed-size array that stores respective timestamps of last accesses of the data items to determine which ones of the data items are accessed within a range of time to use to determine an estimate of a working set for the application within the range of time may be accessed. For instance, as discussed in detail below with regard to FIG. 7, a scanning technique to identify leading zero counts for data items within a window of time may be applied in order to collect input data to use a HyperLogLog estimation technique for a working set. As indicated at 612, an amount of computing resources, such as an amount of processing capacity, network bandwidth and/or data storage (e.g., size of a buffer cache in terms of a number of entries) and the estimate of the working set for the application within the range to time may be used to determine the working set ratio of data items for the application, in some embodiments. For example, the ratio may be determined by dividing one term (e.g., amount of computing resources or the estimate of the working set) by the other term.

As indicated at 620, scaling of the amount of the computing resources allocated to the application based on the determined working set ratio of data items may be automatically performed, in some embodiments. For example, the working set ratio may be compared with one (or more) ratio thresholds for different scaling events (e.g., scale up event or scale down event). If the working set exceeds (or falls below) the ratio threshold, then the scaling event may be triggered. In some embodiments, scaling events may have multiple criteria. For example, a scale down event may, in some embodiments, also utilize an item usage count (e.g., as determined from a histogram of page usage for a database system), which may also have to satisfy some criteria (e.g., above or below a threshold) in order to trigger the scale down event.

Scaling actions may include operations to increase (in-place) the memory or other data storage available to the application (e.g., by performing various memory allocation operations, techniques, or utilizing other mechanisms, such as a memory balloon to increase or decrease memory pressure). Scaling actions may include increasing (or decreasing) processing capacity (e.g., by obtaining or more less time slices for a processor to perform work for the application). Scaling actions may include increasing (or decreasing) other computing resources by changing those computing resource allocations through modifications to host system configurations or settings, or to a group of systems implementing the application. For example, a cluster of nodes providing a memory data store may be modified by adding or removing nodes to increase or decrease available memory for the application. In some embodiments, movement techniques to reorganize deployment of applications (e.g., moving database systems around as discussed above with regard to FIG. 5) may also be performed.

In some embodiments, the working set ratio may be provided as a performance metric for an application. For example, a metrics tools, system, and/or interface may provide the working set ratio, singly or in combination with other performance metrics for the application (e.g., via graph visualization or text-based representation).

Figure 7:
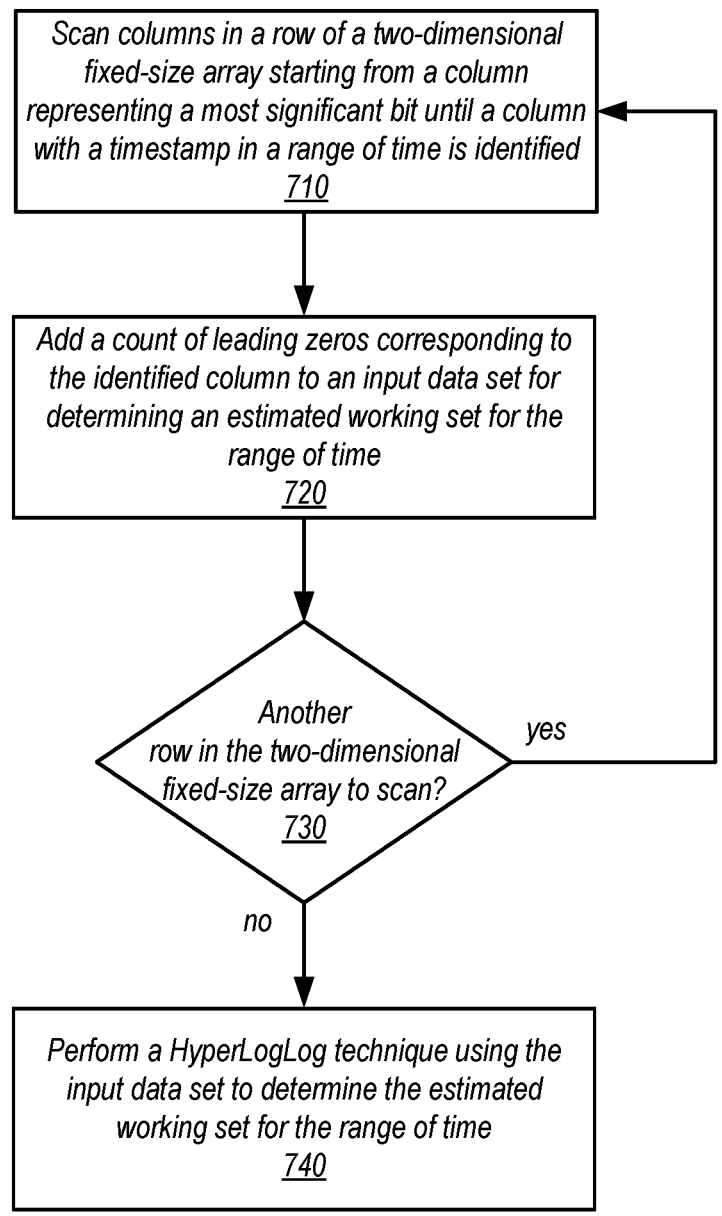
FIG. 7 is a high-level flowchart illustrating various methods and techniques to implement determining a working set ratio using a two-dimensional, fixed-size array, according to some embodiments.
Figure 8:
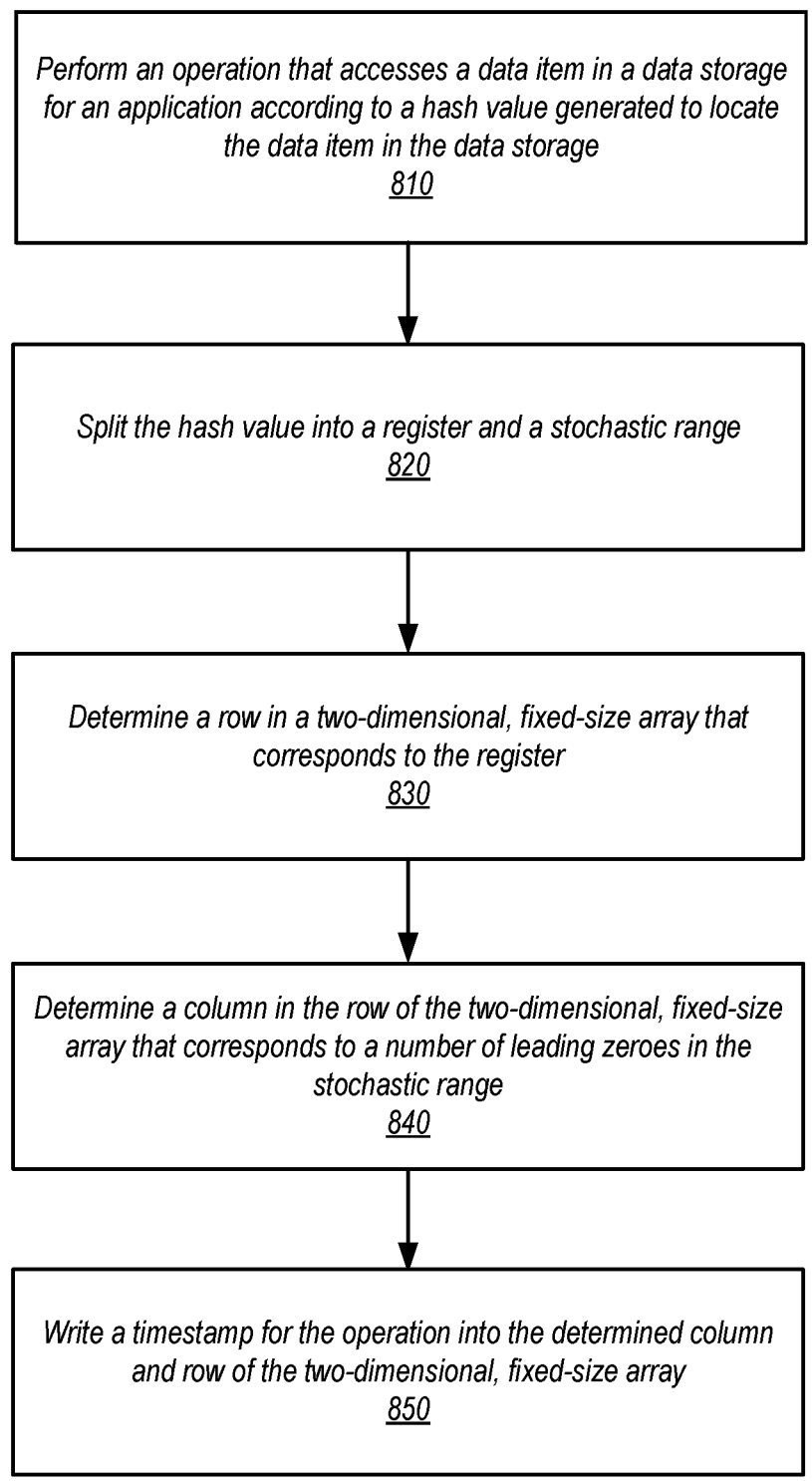
FIG. 8 is a high-level flowchart illustrating various methods and techniques to implement updating a two-dimensional, fixed-size array used for determining a working set ratio, according to some embodiments.

FIG. 7 is a high-level flowchart illustrating various methods and techniques to implement determining a working set ratio using a two-dimensional, fixed-size array, according to some embodiments. As indicated at 710, columns in a row of a two-dimensional, fixed-size array (or other fixed-size data structure that can be used to represent or store a matrix) starting from a column representing a most significant bit until a column with a timestamp is identified in a range of time for an estimated working set, in some embodiments. For example, as discussed above with regard to FIG. 1B, if the range of time is T4 (current) back to T2, then the first column that has a value of T4, T3, or T2, may be identified.

As indicated at 720, a count of leading zeros corresponding to the identified column to an input data set for determining an estimated working set for the range of time may be added to an input data set for determining an estimated working set for the range of time, in some embodiments. For example, an input data set may be stored in a different data structure (e.g., another array). As indicated at 730, scanning of the two-dimensional fixed-size array may continue if there is another row to scan. For example, a next row in the fixed-size array may be scanned.

As indicated by the negative exit from 730, a HyperLogLog technique using the input data set may be performed to determine the estimated working set for the range of time, in some embodiments. For example, HyperLogLog may treat the bits in a hash value like random coin flips and using expected value to guess the number of trials required to observe that value at random. For example, if one were to come across 2 coins, both of which are heads one might conclude that it took about 4 experiments to produce this state (e.g., as there is about a ¼ chance both are heads, so one might expect to run the experiment 4 times before that occurs.) To reduce the variance, part of the hash value may be used as a bucket number, the register, and then recombine the results when making an estimate of the working set. In the context of a database system, the "coins" may be bits set in the hash value for a buffer cache. These bits may be encoded as an integer value representing the number of zeros observed at the start of a hash code (e.g., 2, in the example of coins above). In this way, HyperLogLog can take as input a set of "most significant bit set" and output an estimate of the cardinality (e.g., a number of unique items that make up the working set) to produce this by random chance.

Utilization of the two-dimensional, fixed size array may support a sliding time window implementation without increasing in size, as discussed above with regard to FIG. 1B. Moreover, the two-dimensional, fixed-size array may provide further performance improvements by supporting a lock-free implementation so that the fixed-size array may be updated without disrupting application operations. FIG. 8 is a high-level flowchart illustrating various methods and techniques to implement updating a two-dimensional, fixed-size array used for determining a working set ratio, according to some embodiments.

As indicated at 810, an operation that access a data item in a data storage for an application may be performed. The operation may utilize a hash value that is generated according to a hashing function (e.g., applied to data page, block, or other item identifier). The hash value may be used to locate the data item in data storage (e.g., a cache entry or other location).

As indicated at 820, the hash value may be split into a register and a stochastic range. For example, a hash code "110110011000011010001110111111001" may be split into a register using the first 9 bits, "110110011" and the remaining values "00001101000111011111111001" may be the stochastic range. As indicated at 830, a row in the two-dimensional, fixed size array that corresponds to the register may be determined. For example, "110110011" may correspond to register "435" which may be the determined row. A column in the row of the two-dimensional, fixed-size array that corresponds to a number of leading zeroes in the stochastic range may be determined, in some embodiments, as indicated at 840. For example, the stochastic range "00001101000111011111111001" has four leading zeros, and thus may correspond to column 4 in register 435.

As indicated at 850, a timestamp for the operation (e.g., associated with the receipt of a request, a commit of a change to a data item, an agreement or synchronization between multiple processes, the time of the write to the fixed-size array, etc.) may be written into the determined column and row of the two-dimensional, fixed-size array, in some embodiments. For example, a store operation may be performed to write the timestamp value. In at least some embodiments, a lock-free technique for performing the write may be implemented. For example, a last-write-wins scheme may be implemented where the last writer of a column in a row's value is stored. Thus if, for instance, two different threads want to write timestamps to the same column in the same row, the later thread may overwrite a previously written value of the other thread without harming the accuracy of the estimated working set determined using that timestamp entry. In other embodiments, synchronization techniques to access the fixed-size data structure could be utilized.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
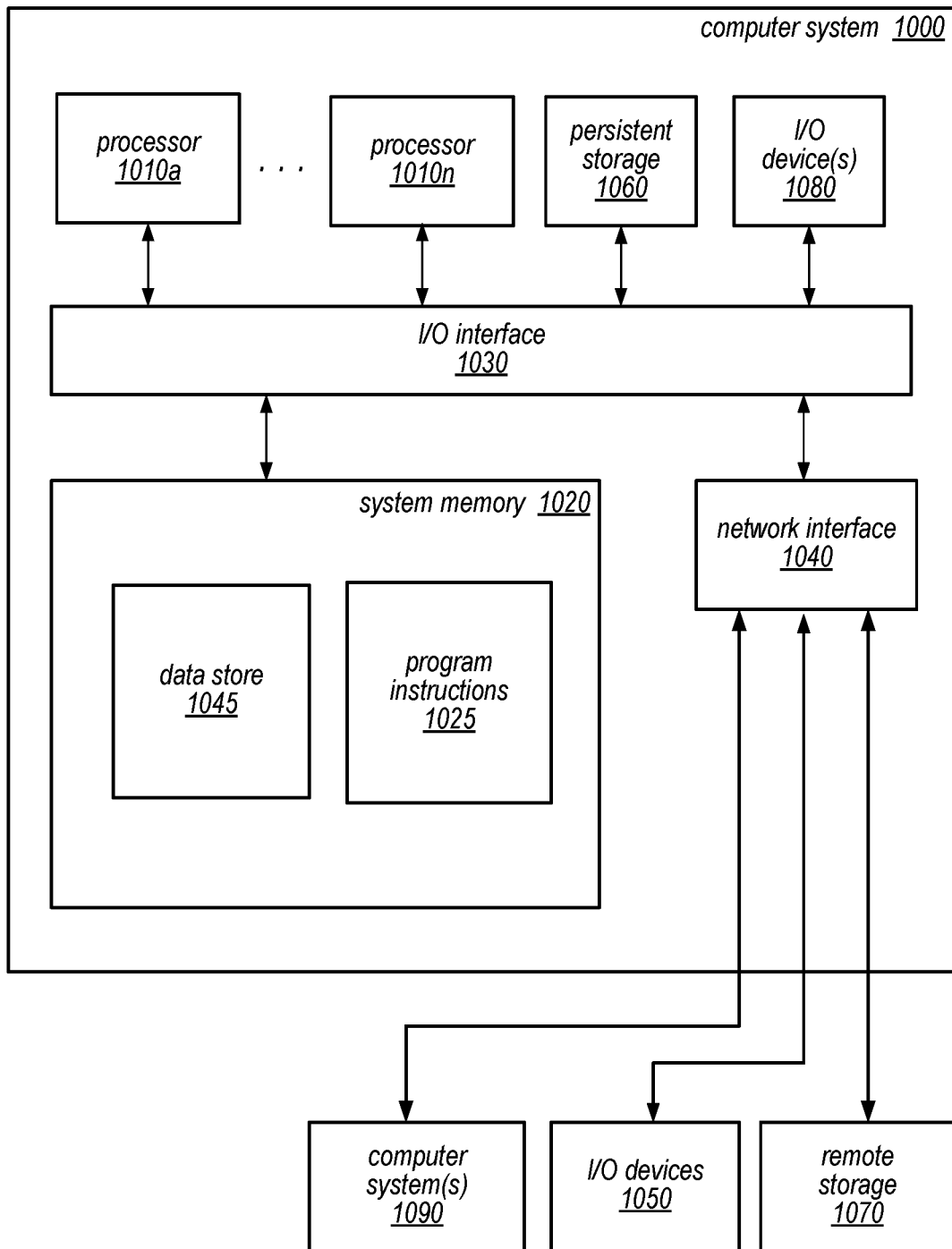
FIG. 9 is a block diagram illustrating an example computer system, according to various embodiments.

FIG. 9 is a block diagram illustrating an example computer system that may implement the techniques for working set ratio estimations of data items in a sliding time window for dynamically allocating computing resources for the data items, according to various embodiments described herein. For example, computer system 1000 may implement a database engine head node and/or one of a plurality of storage nodes of a separate storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein (e.g., various features of working set ratio estimations of data items in a sliding time window for dynamically allocating computing resources for the data items). In various embodiments, program instructions 1025 may be encoded in native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040.

Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to implement a database system, configured to:
monitor a working set ratio of data pages in a buffer cache in the memory for the database to detect a scaling event, wherein to monitor the working set ratio, the database system is configured to:
access a fixed-size array that stores respective timestamps of last accesses of different ones of the data pages without increasing the fixed-size array to determine which ones of the data pages are accessed within a range of time corresponding to a sliding window of time that filters out entries from the fixed-size array outside of the range of time;
based on the access, determine an estimate of a working set for the database system within the range of time;
determine the working set ratio of data pages for the database system from a size of the buffer cache and the estimate of the working set for the database system within the range of time; and
compare the working set ratio with a ratio threshold for scaling events; and
responsive to the detection of the scaling event, cause the size of the buffer cache to be increased or decreased according to the detected scaling event.

2. The system of claim 1, wherein the fixed-size array is a two-dimensional array, wherein rows of the fixed-size array correspond to different registers split from respective hash values used to locate the data pages in the buffer cache, wherein columns of the fixed-size array correspond to different numbers of leading zeros to different stochastic ranges split from the respective hash values, and wherein to determine the estimate of the working set for the application within the range of time based on the access, the database system is configured to:
scan columns in each of the rows of the fixed-size array, starting from a column representing a most significant bit until a scanned column that stores a timestamp in the range of time is identified;
add the number of leading zeros corresponding to the identified columns for the rows to an input data set; and
perform a HyperLogLog estimation technique using the input data set to determine the estimated working set for the range of time.

3. The system of claim 1, wherein the database system is further configured to:
for a request performed by the database system that accesses one of the data pages in the buffer cache:
split the respective hash value for the one data item into the register and a stochastic range;
determine one of the rows in the fixed-size array that corresponds to the register;
determine a column in the one row that corresponds to a count of leading zeroes in the stochastic range; and
write a timestamp for the operation into the determined column and row of the fixed-size array.

4. The system of claim 1, wherein the database system is implemented as part of a relational database service offered by a provider network, wherein the monitoring of the working set ratio is enabled in accordance with a selection of a serverless configuration type for the database system via an interface of the relational database service.

5. A method, comprising:
determining a working set ratio of data items for an application, comprising:
accessing a fixed-size array that stores respective timestamps of last accesses of different ones of the data items without increasing the fixed-size array to determine which ones of the data items are accessed within a range of time corresponding to a sliding window of time that filters out entries from the fixed-size array outside of the range of time;
based on the accessing, determining an estimate of a working set for the application within the range of time; and
determining the working set ratio of data items for the application from an amount of computing resources allocated to the application and the estimate of the working set for the application within the range of time; and
automatically scaling the amount of the computing resources allocated to the application based, at least in part, on the determined working set ratio of data items.

6. The method of claim 5, wherein the fixed-size array is a two-dimensional array, wherein rows of the fixed-size array correspond to different registers split from respective hash values used to locate the data items in a data storage, wherein columns of the fixed-size array correspond to different numbers of leading zeros to different stochastic ranges split from the respective hash values, and wherein determining the estimate of a working set for the application within the range of time based on the accessing, comprises:
scanning columns in each of the rows of the fixed-size array, starting from a column representing a most significant bit until a scanned column that stores a timestamp in the range of time is identified;
adding the number of leading zeros corresponding to the identified columns for the rows to an input data set; and
performing a HyperLogLog estimation technique using the input data set to determine the estimated working set for the range of time.

7. The method of claim 6, further comprising:
for an operation of the application that accesses one of the data items in the data storage:
splitting the respective hash value for the one data item into the register and a stochastic range;
determining one of the rows in the fixed-size array that corresponds to the register;
determining a column in the one row that corresponds to a count of leading zeroes in the stochastic range; and
writing a timestamp for the operation into the determined column and row of the fixed-size array.

8. The method of claim 7, wherein the timestamp is written into the determined column and row of the fixed-size array without obtaining a lock on the fixed-size array.

9. The method of claim 5, wherein the automatically scaling the amount of the computing resources allocated to the application is further based on a histogram of usage counts maintained for the data items.

10. The method of claim 5, providing, via an interface for the application, the working set ratio as a performance metric for the application.

11. The method of claim 5, wherein automatically scaling the amount of the computing resources allocated to the application comprises moving a different application from a same host system as the application to another host system.

12. The method of claim 5, wherein the computing resources comprises a plurality of storage nodes, and wherein automatically scaling the amount of the computing resources allocated to the application causes an additional storage node to be added to the plurality of storage nodes.

13. The method of claim 5, wherein automatically scaling the amount of the computing resources allocated to the application is performed responsive to a scaling event detected by comparing the working set ratio with a ratio threshold for scaling events.

14. One or more non-transitory, computer-readable storage media, storing program instructions that when executed on or across one or more computing devices cause the one or more computing devices to implement:
   determining a working set ratio of data items for an application, wherein the program instructions cause the one or more computing devices to implement:
      accessing a fixed-size array that stores respective timestamps of last accesses of different ones of the data items without increasing the fixed-size array to determine which ones of the data items are accessed within a range of time corresponding to a sliding window of time that filters out entries from the fixed-size array outside of the range of time;
      based on the accessing, determining an estimate of a working set for the application within the range of time; and
      determining the working set ratio of data items for the application from an amount of computing resources allocated to the application and the estimate of the working set for the application within the range of time; and
   causing the amount of the computing resources allocated to the application to be increased or decreased based, at least in part, on the determined working set ratio of data items.

15. The one or more non-transitory, computer-readable storage media of claim 14, wherein the fixed-size array is a two-dimensional array, wherein rows of the fixed-size array correspond to different registers split from respective hash values used to locate the data items in the data storage, wherein columns of the fixed-size array correspond to different numbers of leading zeros to different stochastic ranges split from the respective hash values, and wherein, in determining the estimate of a working set for the application within the range of time based on the accessing, the program instructions cause the one or more computing devices to implement:
   scanning columns in each of the rows of the fixed-size array, starting from a column representing a most significant bit until a scanned column that stores a timestamp in the range of time is identified;
   adding the number of leading zeros corresponding to the identified columns for the rows to an input data set; and
   performing a HyperLogLog estimation technique using the input data set to determine the estimated working set for the range of time.

16. The one or more non-transitory, computer-readable storage media of claim 15, storing further instructions that when executed on or across the one or more computing devices, cause the one or more computing devices to implement:
   for an operation of the application that accesses one of the data items in a data storage:
      splitting the respective hash value for the one data item into the register and a stochastic range;
      determining one of the rows in the fixed-size array that corresponds to the register;
      determining a column in the one row that corresponds to a count of leading zeroes in the stochastic range; and
      writing a timestamp for the operation into the determined column and row of the fixed-size array.

17. The one or more non-transitory, computer-readable storage media of claim 14, storing further instructions that when executed on or across the one or more computing devices, cause the one or more computing devices to implement providing, via an interface for the application, the working set ratio as a performance metric for the application.

18. The one or more non-transitory, computer-readable storage media of claim 5, wherein the computing resources comprise a plurality of storage nodes, and wherein causing the amount of the computing resources allocated to the application to be increased or decreased causes one of the plurality of storage nodes to be removed from storing the data items.

19. The one or more non-transitory, computer-readable storage media of claim 14, wherein causing the amount of the computing resources allocated to the application to be increased or decreased is performed responsive to a scaling event detected by comparing the working set ratio with a ratio threshold for scaling events.

20. The one or more non-transitory, computer-readable storage media of claim 14, wherein the application is a database system that is implemented as part of a database service offered by a provider network, wherein the determining of the working set ratio is enabled in accordance with a selection of a serverless configuration type for the database system via an interface of the database service.

* * * * *